Patented Oct. 6, 1936

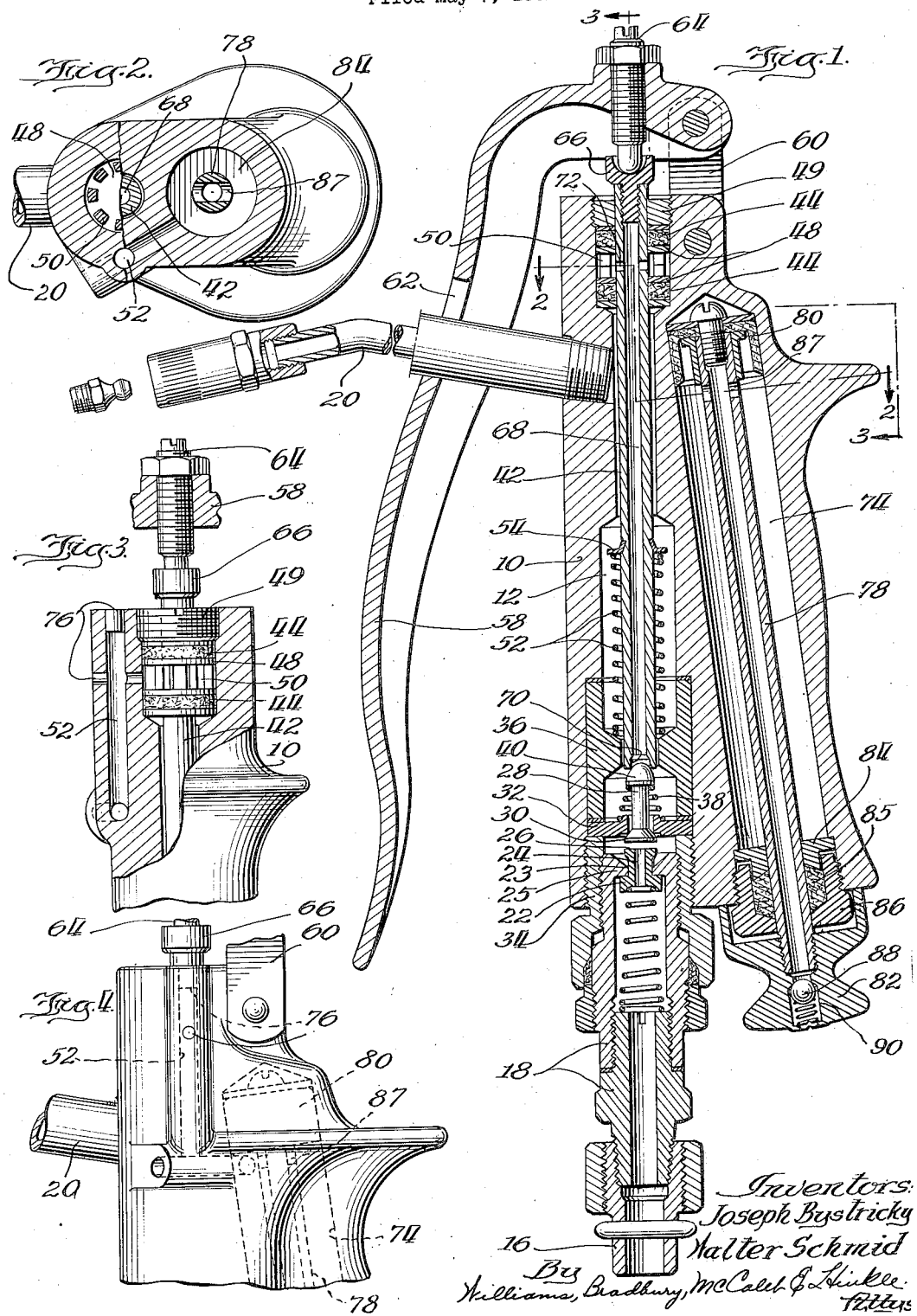

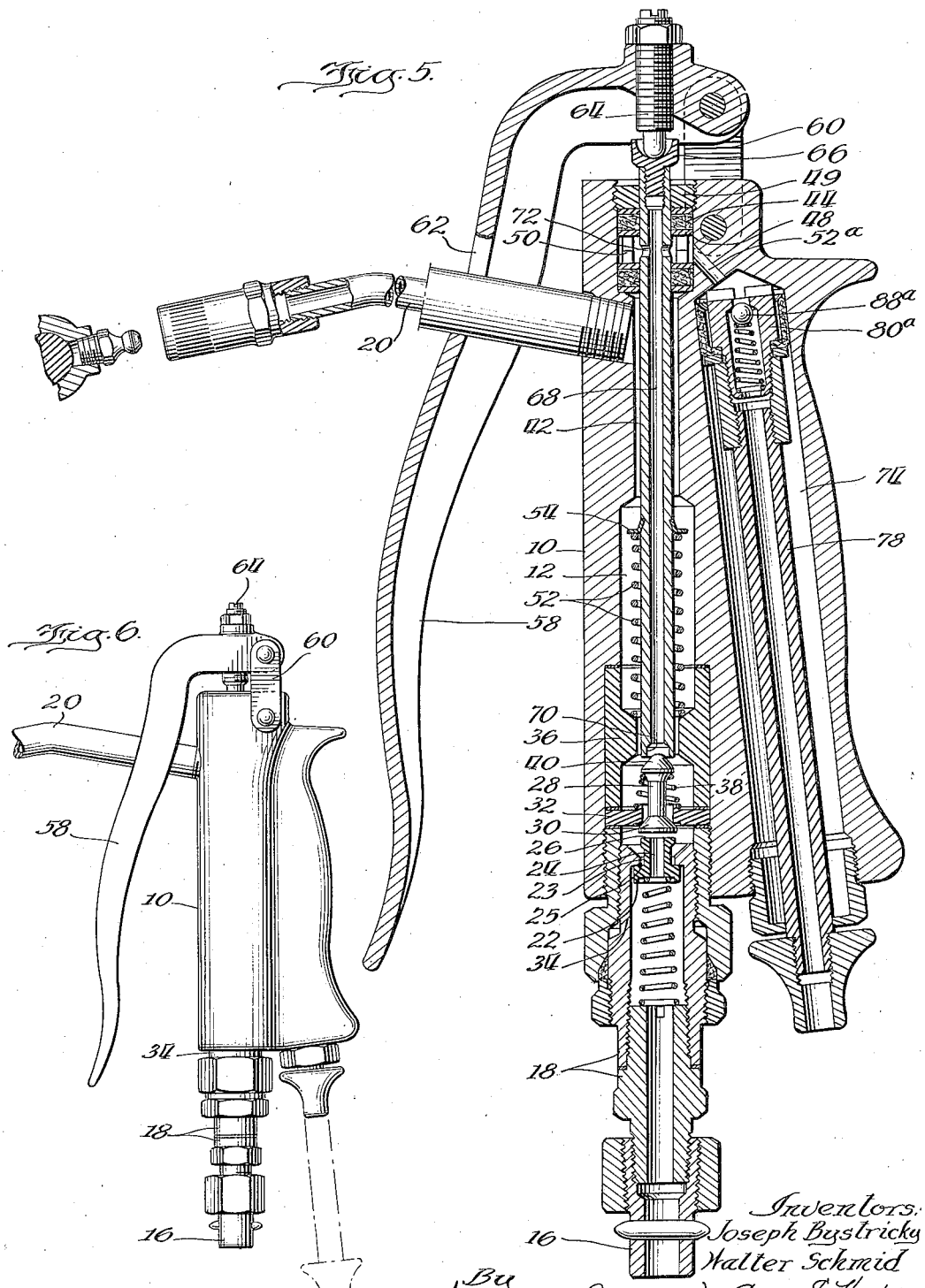

2,056,250

UNITED STATES PATENT OFFICE 2,056,250

CONTROL VALVE

Joseph Bystricky and Walter Schmid, Chicago, Ill., assignors to Stewart-Warner Corporation, Chicago, Ill., a corporation of Virginia Application May 7, 1934, Serial No. 724,301

16 Claims. (Cl. 221—47.4)

Our invention relates to a control valve and particularly to a control valve for use with high pressure greasing equipment.

More particularly, our invention relates to improvements on the control valve shown in copending application of Joseph Bystricky and George H. Thomas, Serial No. 677,242, filed June 23, 1933.

In high pressure greasing, it is customary to provide a power compressor which pumps grease through a suitable conduit or hose to the bearing to be lubricated. The flow of grease may be controlled by a valve located in the conduit or hose line near the end to be attached to the bearing. This valve may be of the type shown in the above-mentioned copending application. In operation not only the section of the conduit or hose between the compressor and valve, but also that between the valve and the bearing, is under very high pressure which may be as great as 10,000 pounds per square inch.

If this pressure is not relieved before disconnecting the conduit from the bearing, grease will spurt out of the free end of the hose when such disconnection is effected. This is caused partly by the sudden contraction of the hose as pressure is released and partly by the expansion of small quantities of air frequently present in the grease. Also where couplings are used which mechanically attach the hose to a fitting leading to the bearing to be lubricated, it is usually desirable to relieve the pressure in the coupling in order to facilitate detachment of the coupling from the fitting.

It is an important function of our improved control valve to provide a means for relieving the pressure in the conduit between the valve and the fitting.

Another object is to provide a means for relieving this pressure automatically upon closing movement of the control valve.

Another object is to provide a chamber for receiving the grease which may be expelled as pressure is relieved by the automatic action of the valve.

Another object in one form of our invention is to provide a chamber which is expansible to receive expelled grease.

Another object is to provide an over-flow means from a retaining chamber, which will allow grease to escape from the chamber when it has become filled with grease, but not before.

Another object is to provide an over-flow means from an expansible chamber, which will allow grease to escape from the chamber when its limit of expansion is reached, but not before.

Another object is to provide a means for expelling grease from the retaining chamber at the will of the operator.

Another object is to provide a control valve which embodies an automatic pressure relief and a retaining chamber for accumulating expelled grease, and which is, at the same time, neat, compact, pleasing in appearance, and inexpensive to manufacture.

Further objects and advantages of our invention will appear in the course of the following specification.

Best understanding of our invention may be had by one skilled in the art by reference to the following drawings in which:

Figure 1 is an enlarged longitudinal sectional view showing the operating parts of our improved control valve;

Figure 2 is a sectional view of our control valve along the line 2—2 of Figure 1;

Figure 3 is a partial section along the line 3—3 of Figure 1;

Figure 4 is a fragmentary elevational view of the upper end of the body of the control valve of Figure 1, showing the port arrangement;

Figure 5 is a longitudinal sectional elevation of a modified form of our control valve; and Figure 6 is a side elevational view on a reduced scale of the modification shown in Figure 5.

Referring now to Figure 1:

The main body 10 of our valve is a casting having a central chamber 12 extending throughout its length. A high pressure grease hose is connected in any suitable manner, as by way of a coupling 16 and suitable unions indicated generally at 18, to the lower or inlet end of the central chamber 12.

The outlet conduit is here shown as a pipe 20 which is screw-threaded into an opening leading to the upper part of the central chamber 12.

To control the flow of grease we utilize a valve system like that described in the aforementioned copending application. This valve system forms no part of our present invention and will accordingly be described only briefly. A normally spring seated valve 22 is provided which has a central passage 24 terminating in a valve seat 26. Valve 22 has a square shank 23 which passes through a cylindrical guide 25 so that grease may flow past it when the valve is opened. Cooperating with valve 22 we provide a second valve 28 which has a lower conical closure member 30 seating within a suitable valve seat washer 32. This valve seat washer is held in place between a sleeve 34 screw-threaded into the main body of the valve and a guide 36. To hold the second valve 28 normally closed, a tapered coiled spring 38 is provided which seats against the valve seat washer 32 and acts against an upper conical closure member 40 of the valve.

This valve system is operated by a plunger 42 which at its lower end engages valve member 30. This plunger has flat sides so that grease may flow by it. It is furnished with a guide at its upper end which also serves as a packing or stuffing box. To form this guide and packing, two soft packing washers 44 are spaced apart by two spacing washers 48 and are held tightly in place between two metal washers by means of a screw threaded bushing 49. The spacing washers 48 serve to form an annular space 50 for a purpose which will appear hereinafter.

The plunger 42 is held in up or closed position by a coiled spring 52 which acts against a washer 54 staked to the plunger and seats against an inwardly extending flange of the plunger guide 36. The plunger is actuated by means of a handle 58 pivoted on a pair of floating links 60. An aperture 62 is provided in the handle which fits over the conduit 20. The handle engages the plunger by means of an adjustable screw-threaded member 64 on the handle and a cup-shaped member 66 which is screw-threaded into the plunger 42.

Thus far the operation of our valve is as follows: When the plunger is actuated by the handle, it first engages the second valve member 28 and unseats the lower conical closure element 30 against the pressure of the grease. This takes place with a sudden movement when the hand pressure becomes great enough to overcome the grease pressure. The second valve member thus moves quickly into closing engagement with the lower or first valve member 22 and thereby closes the passage 24 through the latter. As a result, a spurt of grease is allowed to pass by the second valve member and up along the outside of the plunger to the outlet conduit 20.

If a steady flow of grease is desired, the handle is further actuated so that the plunger continues its movement and acting through valve member 28 unseats valve member 22, thus allowing the grease to flow past it. When the handle is released the valves are operated to close in reverse sequence. It will be seen, however, that grease will remain under pressure above the valves even after the valves have been closed. This is particularly true where a viscous grease is being forced into a tight bearing. Our invention provides a means for relieving this pressure. An axial passage 68 is provided through plunger 42 and at the lower end of the plunger a seat 70 is provided for engagement with the upper conical closure member 40 of valve 28. When the plunger is moved in downward or valve opening direction this seat closes the axial passage so that grease may not pass into it. However, when the plunger is allowed to move in an upward or valve closing direction, the seat 70 is disengaged and grease may pass into and through the axial passage 68 in the plunger.

An outlet from the passage 68 in the plunger is provided by cross bores 72 in its upper end. Surrounding the cross bores is the annular space 50 formed between the spacing washers 48, and this leads in turn through suitable drilled out ducts 52 to a second retaining chamber 74. (See Figures 2 and 3.) These ducts are suitably stopped against leakage to the outside by tight fitting plugs 76.

Within the retaining chamber we have provided a hollow expelling plunger 78 which is fitted with a cup-leather head 80 at one end and with an operating knob 82 at the outer end. The expelling plunger 78 passes through a guide and packing comprising a retaining bushing 84, a washer of packing material 85, and a screw-threaded bushing 86. Cross holes 87 are provided to allow ingress of grease to the hollow part of the plunger.

It will be noted that the operating knob 82 is provided with a skirt which surrounds and covers the screw-threaded bushing 86. The knob has a central passage in which is located a ball and spring valve 88. The valve operates in a suitable recess 90 within the knob.

This valve is provided for the purpose of retaining any grease which may accumulate within the hollow expelling plunger so that it will not drip out on the operator's hands or clothing. It will be seen, however, that when the retaining chamber is filled by increments of grease, the grease will find an outlet through the cross-holes 87 and the hollow expelling plunger and will finally be forced past the ball and spring valve 88. The operator may then expel all of the grease from the retaining chamber by pulling the knob 82 outwardly. The expelled grease may, of course, be deposited back in the supply barrel or in any suitable retainer.

We have shown a modified form of our invention in Figures 5 and 6. In this form the duct 52$^a$ leads into the retaining chamber above the cup-leather head 80$^a$ of the expelling plunger and the valve 88$^a$ is provided with a sufficiently strong spring so that the grease pressure will not cause the valve to open until the plunger has been forced outwardly to the limit of its movement. In this way the operator will be able to know how much of the retaining chamber has been filled with grease without waiting until the grease has begun to leak past the valve.

While throughout this specification we have referred to the use of this valve in connection with high pressure greasing, it will be equally useful when any fluid under high pressure is to be controlled, and therefore wherever the word "grease" is used in this specification, it should be understood that it is intended to include not only grease, but any fluid under high pressure.

While we have thus described a specific embodiment of our invention, we do not intend to limit ourselves to this particular form.

We claim:

1. In mechanism of the class described, the combination of a body providing a valve chamber and a cylinder, a valve located in said valve chamber and normally preventing lubricant flow therethrough, resilient means urging said valve toward closed position, other means for opening said valve to permit flow of lubricant through said valve chamber, a discharge conduit for lubricant flowing past said valve, means acting automatically to establish communication between said cylinder and the outlet side of said valve upon closure thereof whereby lubricant pressure in said conduit may be relieved by flow of lubricant from said conduit into said cylinder, and a valved exit for said cylinder.

2. In mechanism of the class described, means providing a lubricant passageway, and a discharge conduit and receptacle normally communicating in parallel with one end of said passageway, means whereby lubricant under pressure may be supplied to the other end of said passageway, normally closed valve means intermediate said passageway for preventing flow therethrough, said receptacle receiving lubricant from said conduit whereby lubricant pressure in the latter is relieved, means acting simultaneously to cut off communication between said receptacle and said passageway and to open said valve, and a handle for operating said last-named means.

3. In mechanism of the class described, means providing a passageway, a discharge conduit communicating with one end of said passageway, means whereby lubricant under pressure may be supplied to the other end of said passageway, receptacle means communicating with the first-mentioned end of said passageway, valve means intermediate the ends of said passageway to control flow therethrough, valve means controlling communication between said passageway and said receptacle, a single handle for operating said two valve means simultaneously whereby one is closed when the other is open, said receptacle means receiving lubricant from said conduit whereby lubricant pressure in said conduit is relieved, and means for discharging from said receptacle means any lubricant collected therein.

4. In mechanism of the class described, the combination of means providing a passageway adapted to be connected with a source of fluid-like substance under pressure, a discharge conduit connected to said passageway, valve means in said passageway to control flow therethrough, manual means for opening said valve means, and means for relieving pressure in said discharge conduit and that part of said passageway adjacent thereto comprising a cylinder, means for placing said cylinder in communication with said passageway and discharge conduit when said valve means is in closed position, a piston reciprocable in said cylinder to discharge the fluid-like substance therefrom, and a valved exit for said cylinder permitting discharge therefrom whenever the pressure in said cylinder exceeds a few pounds above atmospheric pressure.

5. In mechanism of the class described, means providing a passageway adapted to be connected at one end to a source of fluid-like substance under pressure and at the other end with a part to be supplied with said fluid-like substance, a valve for controlling flow through said passageway, a receptacle, means for operating said valve, means providing communication between said receptacle and the outlet side of said valve whereby increments of said fluid-like substance may pass from said passageway to said receptacle, and means for indicating at all times the quantity of fluid-like substance in said receptacle.

6. In lubricating apparatus of the class described, the combination of means providing a passageway adapted to be connected at one end to a source of lubricant under pressure and at the other end to a bearing, a valve for controlling flow through said passageway and into said bearing, a receptacle, common means for opening said valve and controlling communication between said receptacle and said passageway, means for indicating the quantity of lubricant in said receptacle, and means in said receptacle for discharging lubricant therefrom.

7. In mechanism of the class described, the combination of a body providing a passageway adapted to be connected at one end to a source of fluid-like substance under pressure and at the other end with means for receiving said substance, a valve controlling flow through said passageway, a receptacle, means for establishing communication with said receptacle and said passageway to relieve the pressure therein, and means for limiting the pressure which can be built up in said receptacle.

8. In mechanism of the class described, the combination of a body providing a passageway adapted for attachment at one end with a source of fluid under pressure and at the other end with a part for receiving said fluid, a valve normally closing said passageway, means for opening said passageway to permit fluid to flow therethrough, a receptacle, means for establishing communication between said receptacle and said passageway to relieve pressure existing in the latter, means for indicating the quantity of fluid in said receptacle, means for discharging fluid from said receptacle, and means for preventing the creation of a high pressure in said receptacle.

9. In mechanism of the class described, the combination of a body providing a passageway adapted to be connected at one end to a source of fluid under pressure and at the other end to a part for receiving said fluid, a valve controlling said passageway, means for operating said valve, a cylindrical receptacle, a piston in said receptacle, means for establishing communication between said passageway and a part of said receptacle above said piston, means carried by said piston for indicating the position thereof in said receptacle, and means whereby said piston may be reciprocated to discharge fluid from said receptacle.

10. In mechanism of the class described, means providing a passageway adapted to be connected at one end to a source of lubricant under pressure and at the other end to a bearing for receiving a lubricant, a valve normally closing said passageway, means for operating said valve, a receptacle, means for connecting the discharge end of said passageway with said receptacle to relieve the pressure in said passageway, a piston in said receptacle, said piston having a passageway therethrough, a valve located in said passageway, and means for reciprocating said piston.

11. In mechanism of the class described, the combination of a body providing a passageway therethrough, a valve normally closing said passageway, means whereby said passageway can be connected with a source of fluid under pressure and whereby said passageway can be further connected with a part for receiving said fluid, valve means controlling flow through said passageway, a receptacle, means for operating said valve and for establishing communication between said passageway and said receptacle, a piston in said receptacle, a handle for operating said piston, a hollow stem connecting said piston with said handle, said hollow stem communicating with said receptacle and providing an outlet passage therefor, and valve means in said handle controlling said passage.

12. In mechanism of the class described, the combination of a body providing a passageway adapted to be connected at one end with a source of fluid under pressure and at the other end with a part for receiving such fluid, a member located in said passageway and having a valve element at each end, a seat cooperating with one of said valve elements to prevent flow through said passageway, a member providing a pressure relief passageway, said last-named member cooperating with the other valve element to close said pressure relief passageway, and a single handle for controlling flow through said first-named passageway and for controlling communication between said passageways.

13. In lubricating apparatus of the class described, a body providing a passageway and a receptacle, said passageway adapted to have one of its ends connected with a source of lubricant under pressure and its other end connected to a bearing, a valve normally closing said passageway, a tubular member for opening said valve, said tubular member affording communication between said passageway and said receptacle, said tubular member and valve having cooperating parts to close communication between said passageway and receptacle when said valve is opened, and a handle for reciprocating said tubular member.

14. In lubricating apparatus of the class described, a body providing a passageway and a receptacle, said passageway adapted to have one of its ends connected with a source of lubricant under pressure and its other end connected to a bearing, a valve normally closing said passageway, a tubular member for opening said valve, said tubular member affording communication between said passageway and said receptacle, said tubular member and valve having cooperating parts to close communication between said passageway and receptacle when said valve is opened, a handle for reciprocating said tubular member, and means for indicating the quantity of lubricant in said receptacle.

15. In lubricating apparatus of the class described, a body providing a passageway and a receptacle, said passageway adapted to have one of its ends connected with a source of lubricant under pressure and its other end connected to a bearing, a valve normally closing said passageway, a tubular member for opening said valve, said tubular member affording communication between said passageway and said receptacle, said tubular member and valve having cooperating parts to close communication between said passageway and receptacle when said valve is opened, a handle for reciprocating said tubular member, means for indicating the quantity of lubricant in said receptacle, and means for discharging lubricant therefrom.

16. In lubricating apparatus of the class described, a body providing a passageway and a receptacle, said passageway adapted to have one of its ends connected with a source of lubricant under pressure and its other end connected to a bearing, a valve normally closing said passageway, a tubular member for opening said valve, said tubular member affording communication between said passageway and said receptacle, said tubular member and valve having cooperating parts to close communication between said passageway and receptacle when said valve is opened, a handle for reciprocating said tubular member, means for indicating the quantity of lubricant in said receptacle, means for discharging lubricant therefrom, and means for limiting the pressure which can be built up in said receptacle.

JOSEPH BYSTRICKY.
WALTER SCHMID.